US012812207B2

(12) United States Patent
Kumagai et al.

(10) Patent No.: US 12,812,207 B2
(45) Date of Patent: Nov. 24, 2026

(54) INFORMATION DISPLAY SYSTEM

(71) Applicant: Panasonic Intellectual Property Management Co., Ltd., Osaka (JP)

(72) Inventors: Shigehiro Kumagai, Kyoto (JP); Yoshiyuki Furuya, Osaka (JP); Keisuke Masatoki, Nara (JP); Kenji Seto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/068,207

(22) Filed: Mar. 3, 2025

(65) Prior Publication Data

US 2025/0294211 A1 Sep. 18, 2025

Related U.S. Application Data

(60) Provisional application No. 63/566,477, filed on Mar. 18, 2024.

(51) Int. Cl.
*H04N 21/442* (2011.01)
*B64D 11/00* (2006.01)
(Continued)

(52) U.S. Cl.
CPC ..... *H04N 21/4424* (2013.01); *B64D 11/0015* (2013.01); *B64D 45/00* (2013.01);
(Continued)

(58) Field of Classification Search
CPC ......... H04N 21/4424; H04N 21/41422; H04N 21/4348; H04N 21/43635;
(Continued)

(56) References Cited

U.S. PATENT DOCUMENTS

| | | | |
|---|---|---|---|
| 9,571,619 | B2 | 2/2017 | Akama et al. |
| 2003/0156097 | A1 | 8/2003 | Kakihara et al. |

(Continued)

FOREIGN PATENT DOCUMENTS

| | | |
|---|---|---|
| JP | 5-232916 | 9/1993 |
| JP | 2003-244343 | 8/2003 |

(Continued)

OTHER PUBLICATIONS

Extended European Search Report issued May 13, 2025 in European Patent Application No. 25157634.4.

*Primary Examiner* — Anthony Bantamoi
(74) *Attorney, Agent, or Firm* — Wenderoth, Lind & Ponack, L.L.P.

(57) ABSTRACT

An information display system (10) is installed in a mobile body, and includes an information processing device (21) that receives a maintenance signal from an external device (11), an information display device (31) that is configured to have a different housing from that of the information processing device (21) and has a display (31*g*), and a first signal line (21*f*) that connects the information processing device (21) and the information display device (31) and allows a video signal of the display (31*g*) to be transmitted by serial communication. The information processing device (21) has a first processing unit (21*e*) that combines the maintenance signal with the video signal displayed on the display (31*g*) and transmits the combined signal via the first signal line (21*f*). The information display device (31) further has a processor (31*b*) that responds to the maintenance signal, and a second processing unit (31*e*) that decomposes the combined signal received from the first processing unit (21*e*), transmits the maintenance signal to the processor (31*b*), and transmits the video signal to the display (31*g*).

12 Claims, 3 Drawing Sheets

(51) Int. Cl.

| | |
|---|---|
| ***B64D 45/00*** | (2006.01) |
| ***H04N 21/414*** | (2011.01) |
| ***H04N 21/434*** | (2011.01) |
| ***H04N 21/4363*** | (2011.01) |
| ***H04N 21/643*** | (2011.01) |

(52) U.S. Cl.
CPC ... *H04N 21/41422* (2013.01); *H04N 21/4348* (2013.01); *H04N 21/43635* (2013.01); *H04N 21/64322* (2013.01); *B64D 2045/0085* (2013.01)

(58) Field of Classification Search
CPC ........... H04N 21/64322; H04N 17/004; H04N 21/4104; H04N 21/2146; H04N 21/43632; H04N 21/44231; B64D 11/0015; B64D 45/00; B64D 2045/0085
See application file for complete search history.

(56) References Cited

U.S. PATENT DOCUMENTS

| | | | | |
|---|---|---|---|---|
| 2005/0273662 | A1* | 12/2005 | Yi ........................... | G06F 11/00 |
| 2006/0174285 | A1 | 8/2006 | Brady et al. | |
| 2016/0212253 | A1 | 7/2016 | Akama et al. | |

FOREIGN PATENT DOCUMENTS

| | | |
|---|---|---|
| KR | 10-0455534 | 10/2004 |
| WO | 2015/033761 | 3/2015 |

* cited by examiner

INFORMATION DISPLAY SYSTEM

BACKGROUND

Technical Field

The present disclosure relates to an information display system that provides various kinds of entertainment information about movies, etc., to passengers in seats installed in an aircraft, for example.

Description of the Related Art

In recent years, mobile bodies such as aircraft have featured entertainment systems that include a server having digital content and communicably linked to a communications network, connectors that are disposed near the passengers' seats and are communicably linked to the network, and information display terminals that are connected to the connectors and used by the passengers.

Cabin control terminals that allow the flight attendants to control the system and make settings are connected to such an entertainment system such as this.

For example, Patent Literature 1 discloses an in-flight entertainment system in which information display terminals installed in the passenger seats are each connected to a connector, allowing a passenger whose seat is near a connector to access digital content.

CITATION LIST

Patent Literature

Patent Literature 1: U.S. Patent Application Publication No. 2006-0174285

SUMMARY

Problem to be Solved by the Invention

For example, with the conventional in-flight entertainment system disclosed in the above document, passenger-use information display terminals installed in the seats are connected via Ethernet to seat boxes installed around the seats and to flight attendant-use cabin terminals installed at the front and/or rear of the aircraft.

However, the following problem is encountered with this conventional in-flight entertainment system.

In the event of a malfunction in the information display system, it is conceivable that maintenance of the information display terminal can be performed via Ethernet using the cabin terminals. In that case, if a malfunction of the Ethernet prevents a connection from being made from the cabin terminal to the information display terminal, it may be impossible to identify the cause of the malfunction of the information display terminal.

It is an object of the present disclosure to provide an information display system with which maintenance can be performed on an information display terminal using a passenger terminal and without using an Ethernet connected to the information display terminal.

Means for Solving Problem

The information display system of the present disclosure is an information display system installed in a mobile body, and includes an information processing device that receives a maintenance signal from an external device, an information display device that is configured to have a different housing from that of the information processing device and that has a display, and a first signal line that connects the information processing device and the information display device and allows the video signal of the display to be transmitted by serial communication. The information processing device has a first processing unit that combines the maintenance signal with a video signal to be displayed on the display and transmits the combined signal via the first signal line. The information display device further has a response unit that responds to the maintenance signal, and a second processing unit that decomposes the combined signal received from the first processing unit, transmits the maintenance signal to the response unit, and transmits the video signal to the display.

Effects

With the information display system according to the present disclosure, maintenance can be performed on the information display terminal without using Ethernet.

DETAILED DESCRIPTION OF THE EMBODIMENT

Embodiments will now be described in detail through reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

The information display system 10 according to an embodiment of the present disclosure will be described through reference to FIGS. 1 to 3.

(1) Information Display System 10

Figure 1:
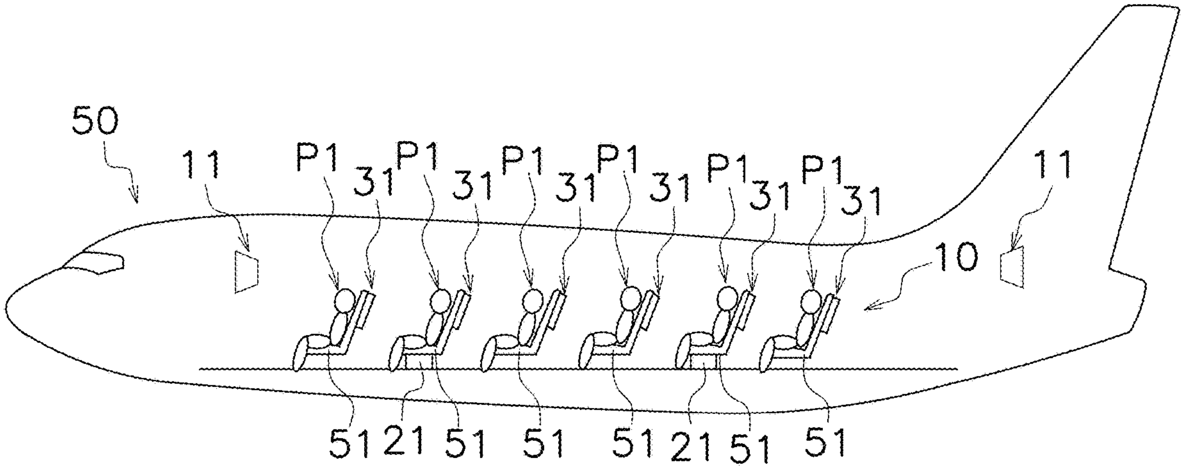
FIG. 1 is a lateral cross-sectional view of the configuration inside an aircraft in which the information display system according to the present disclosure has been installed.

As shown in FIG. 1, the information display system 10 is installed in an aircraft (mobile body) 50, and includes a crew member terminal (external device, aircraft system) 11, an information processing device 21, and an information display device 31. The crew member terminal 11 is operated by a crew member. As shown in FIG. 1, for example, the crew member terminal 11 is provided in front of and behind a plurality of seats 51 in the cabin of the aircraft 50 in which passengers P1 are seated.

Also, the information processing device 21 is a terminal provided to one or more seats, and is connected to the information display device 31.

As shown in FIG. 1, the information processing device 21 is installed in the space under a seat 51. The information display device 31 is operated by a passenger P1 in the seat 51.

The information display device 31 is configured to have a different housing from that of the information processing device 21, and displays contents of the in-flight entertainment system, etc. The information display device 31 is installed at each seat 51 as shown in FIG. 1, for example.

Thus, the information display system 10 is configured as a network system including the crew member terminal 11, the information processing device 21, and the information display device 31.

The crew member terminal 11 can be used to perform maintenance on the information display device 31 by communicating with the information display device 31 via the information processing device 21.

The crew member terminal 11 and the information display device 31 may be connected via another electronic device in addition to the information processing device 21. Also, maintenance on the information display device 31 may be performed by communicating with the information display device 31 in a state in which an electronic device has been connected to the crew member terminal 11.

(2) Crew Member Terminal 11

Figure 2:
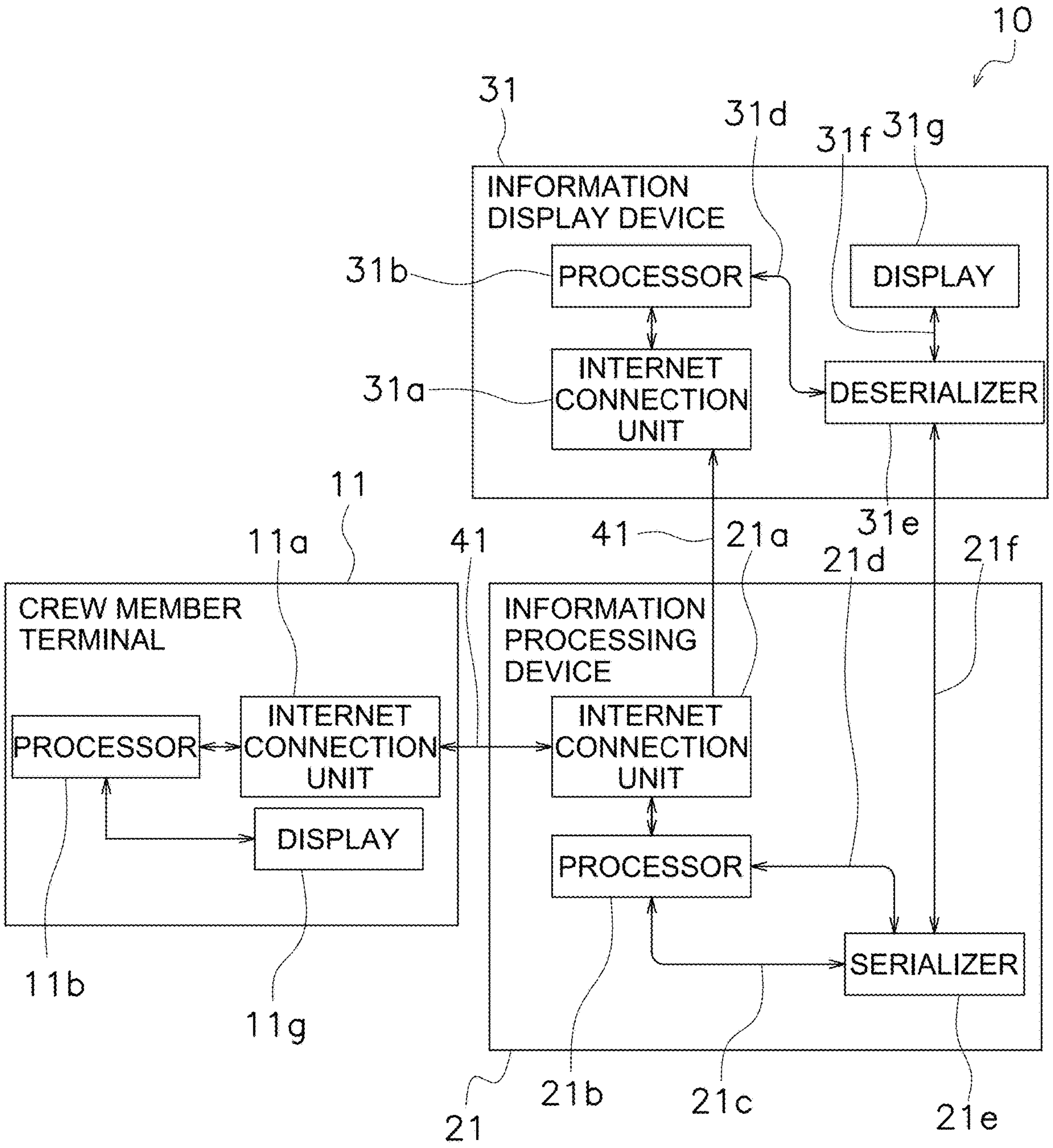
FIG. 2 is a control block diagram showing a crew member terminal, an information processing device, and an information display device installed in the aircraft of FIG. 1.

As shown in FIG. 2, the crew member terminal 11 has an Ethernet connection unit 11*a*, a processor 11*b*, and a display 11*g*. The crew member terminal 11 is connected to the information display device 31 via a LAN (local area network) cable (Ethernet, second signal line) 41 as shown in FIG. 2.

More specifically, the Ethernet connection unit 11*a* is constituted by a connector for connecting to the LAN cable 41, or a terminal of the connector.

The processor 11*b* is connected to the Ethernet connection unit 11*a* and the display 11*g* as shown in FIG. 2. The processor 11*b* controls communication with the information processing device 21, communication with electronic devices connected to the crew member terminal 11, and the display of the display 11*g*. More specifically, the processor 11*b* is constituted by a CPU (central processing unit) or the like, and is connected to storage units not shown in FIG. 1, such as a memory, an HDD (hard disk drive), or an SSD (solid state drive).

The display 11*g* accepts input from a crew member via a touch panel or the like. The crew member can use the display 11*g* to execute a function of controlling the lighting inside the aircraft (mobile body) or a function of diagnosing the information display device 31, for example. In diagnosing the information display device 31, the crew member terminal 11 transmits a maintenance signal (discussed below) to the information display device 31.

(3) Information Processing Device 21

As shown in FIG. 2, the information processing device 21 has at least an Ethernet connection unit 21*a*, a processor (first processor) 21*b*, and a serializer (first processing unit) 21*e*.

More specifically, the Ethernet connection unit 21*a* a connector to which a LAN cable can be connected, and the information processing device 21 is connected to the crew member terminal 11 and the information display device 31 via a LAN cable 41, as shown in FIG. 2.

The processor (first processor) 21*b* processes video to be displayed on the information display device 31. The processor 21*b* is provided corresponding to the information display device 31, and performs processing with a higher load than that of the processor (response unit, second processor) 31*b* on the information display device 31 side. An example of processing with a higher load is expanding a compressed video signal of content in an in-flight entertainment system and transmitting it to the serializer 21*e*.

Also, the processor 21*b* has a higher processing capacity than the processor 31*b* provided on the information display device 31 side.

Here, higher processing capacity means, for example, high CPU specifications (clock frequency, number of cores, number of threads, cache, benchmark, etc.), high RAM capacity, etc.

Consequently, if high-load processing is executed by the processor 21*b* on the information processing device 21 side, the processor 31*b* on the information display device 31 side can be one that has a lower processing capacity than the processor 21*b*. That is, the processing load on the processor 31*b* on the information display device 31 side can be reduced.

More specifically, the processor 21*b* is constituted by a CPU, etc., and is connected to a storage unit such as a memory, HDD, SSD, etc., which is not shown in FIG. 1. As shown in FIG. 2, the processor 21*b* is connected to the serializer 21*e* by two different paths, via a universal asynchronous receive transmitter (UART) 21*d* and a High-Definition Multimedia Interface (HDMI) (registered trademark) 21*c*.

The UART 21*d* employs a method for performing asynchronous (start-stop synchronous) serial communication, and mainly transmits information related to the acquisition of maintenance information.

The HDMI 21*c* is a technical standard for transmitting digitized video and audio at high quality, and is primarily used for transmitting video information.

The HDMI 21*c* may follow some other video transmission standard such as DisplayPort, etc. Also, the UART 21*d* is not limited to the configuration in this embodiment, so long as it is a standard for performing serial communication.

As shown in FIG. 2, the serializer (first processing unit) 21*e* is connected to a deserializer (second processing unit) 31*e* installed in the information display device 31, via a gigabit multimedia serial link (GMSL) (first signal line) 21*f*.

As shown in FIG. 2, the serializer 21*e* combines a signal related to the acquisition of maintenance information received via the UART 21*d*, with a video signal received via the HDMI 21*c*, and transmits the combined signal to the deserializer 31*e* by serial communication. Other functions of the serializer 21*e* are to separate the serial signal received from the deserializer 31*e*, transmit the separated signal related to the acquisition of maintenance information via the UART 21*d*, transmit the separated video signal via the HDMI 21*c*, and so forth.

The processor 21*b*, for example, transmits a video signal to be displayed on the display 31*g* of the information display device 31 (discussed below) to the serializer 21*e* using the HDMI 21*c* as shown in FIG. 2. Also, when a maintenance request for the information display device 31 is received from the crew member terminal 11, the processor 21*b* transmits a signal related to the acquisition of maintenance information to the serializer 21*e* using the UART 21*d* as shown in FIG. 2.

The serializer 21*e* combines the video signal and the signal related to the acquisition of maintenance information received from the processor 21*b* using the HDMI 21*c* and the UART 21*d*, and transmits the combined signal to the deserializer 31*e* by serial communication via the GMSL 21*f*.

Consequently, the processor 21*b* uses the serializer (first processing unit) 21*e* to transmit the video signal to be displayed on the display 31*g* to the deserializer (second processing unit) 31*e* of the information display device 31 via the GMSL 21*f*.

(4) Information Display Device 31

The information display device 31 provides video information such as animations and games, or audio information such as music and radio, as the content of an in-flight entertainment system to passengers P1 on the aircraft 50. As shown in FIG. 2, the information display device 31 has the Ethernet connection unit 31*a*, the processor (response unit, second processor) 31*b*, the deserializer 31*e*, and the display 31*g*.

The Ethernet connection unit 31*a* is, for example, a connector or connector terminal to which a LAN cable can be connected. The information display device 31 is connected to the information processing device 21 via a LAN cable 41 at the Ethernet connection unit 31*a*.

The processor (response unit, second processor) 31*b*, for example, acquires values from sensors, etc., (not shown) installed in the information display device 31, and transmits information about the operating status of the information display device 31 during maintenance to the information processing device 21.

As shown in FIG. 2, the processor 31*b* is connected to the deserializer 31*e* via the UART 31*d* in addition to the Ethernet connection unit 31*a*.

The HDMI 31*f* may be based on some other video transmission standard, such as DisplayPort, etc. Also, the UART 31*d* is not limited to the configuration of this embodiment, so long as it is based on a standard for performing serial communication.

Also, in this embodiment, when a maintenance request is received from the information processing device 21, the processor 31*b* responds, for example, by acquiring the voltage and temperature values for the electronic components attached to the information display device 31, or by identifying bugs in the control software of the information display device 31.

The deserializer 31*e* is connected to the serializer 21*e* of the information display device 31 via the GMSL 21*f*. The deserializer 31*e* separates the serial signal received from the serializer 21*e*, and transmits over a plurality of paths so that the separated signal related to the acquisition of maintenance information is transmitted via the UART 31*d*, and the separated video signal via the HDMI 31*f*. Also, the deserializer 31*e* combines the signals (the signal related to the acquisition of maintenance information and the video signal) received from the multiple paths, namely the UART 31*d* and the HDMI 31*f*, and transmits the combined signal to the serializer 21*e* by serial communication.

During maintenance, the deserializer 31*e* receives a signal related to the acquisition of maintenance information from the serializer 21*e*, and separates the received signal into at least a video signal and a signal related to the acquisition of maintenance information.

The deserializer 31*e* transmits the separated video signal to the display 31*g*, and transmits the signal related to the acquisition of maintenance information to the processor 31*b* using the UART 31*d*.

Here, the communication speed between the serializer 21*e* and the deserializer 31*e* is configured such that the speed of transmission from the serializer 21*e* to the deserializer 31*e* is faster than the speed at which the serializer 21*e* receives from the deserializer 31*e*.

With the information display system 10 in this embodiment, the video signal processed by the information processing device 21 must be transmitted to the information display device 31, so the serializer 21*e* is installed in the information processing device 21 and the deserializer 31*e* is installed in the information display device 31.

(5) LAN Cable 41 and GMSL 21*f*

The LAN cable 41 connects the Ethernet connection units 11*a*, 21*a*, and 31*a* together in a network.

The GMSL (gigabit multimedia serial link) 21*f* is a serial communication link that connects the serializer 21*e* and the deserializer 31*e*, and is used for the communication of signals in which the signals of the UARTs 21*d* and 31*d* and the video signal are superimposed.

Here, the LAN cable 41 may be some other cable having a physical layer protocol compatible with Ethernet, and is not limited to the configuration of this embodiment, so long as it is a cable compatible with packet communication other than Ethernet.

Also, the Ethernet connection units 11*a*, 21*a*, and 31*a* are not limited to the configuration of this embodiment, so long as they are connectors and connector terminals compatible with the standards of the LAN cable 41.

Also, the GMSL 21*f* may be a cable capable of some other kind of serial communication.

Operation

Figure 3:
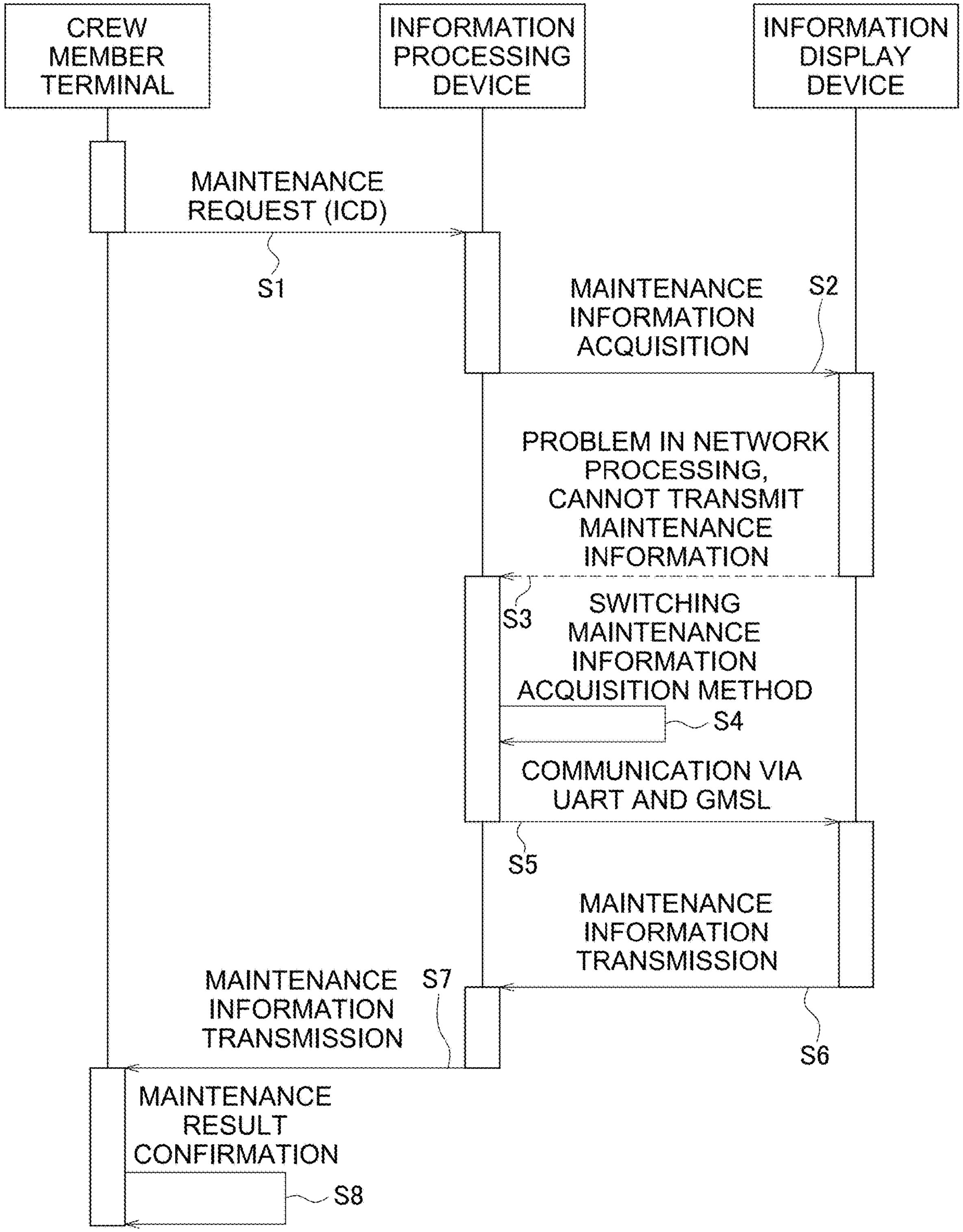
FIG. 3 is a sequence diagram illustrating a maintenance operation when a network failure has occurred between the information display device and the information processing device in the information display system of the present disclosure.

FIG. 3 is a sequence diagram showing a maintenance operation when a network failure has occurred between the information display device 31 and the information processing device 21 in the information display system 10.

The operation of the information display system 10 will now be described, using as an example a case in which a crew member uses the crew member terminal 11 to perform maintenance.

Here, "maintenance" is, for example, acquiring voltage and temperature values for electronic components attached to the information display device 31 from the crew member terminal 11, or identifying bugs in the control software of the information display device 31.

First, a crew member operates a GUI (graphical user interface) displayed on the crew member terminal 11, and transmits a maintenance request from the crew member terminal 11 to the information processing device 21 via the LAN cable 41 (S1).

Here, the "maintenance request" is a notification that requests the information processing device 21 to start communication necessary for carrying out maintenance.

The information processing device 21 that has received a maintenance request from the crew member terminal 11 acquires maintenance information from the information display device 31 via the LAN cable 41 (S2).

Here, the "maintenance information" is, for example, the voltage value or temperature value of an electronic component attached to the information display device 31, as mentioned above.

The maintenance information may be any information indicating the state of the information display device 31, such as a bug in the control software of the information display device 31, and is not limited to the voltage value, temperature value, etc., of an electronic component. At this point, the information processing device 21 and the information display device 31 communicate with each other via the LAN cable 41 according to a predefined command format.

When a request to acquire maintenance information has been received from the information processing device 21, the information display device 31 acquires maintenance information such as the temperature of an electronic component mounted on an electronic board installed in the information processing device 21, and transmits the maintenance information to the information display device 31 via the LAN cable 41.

Next, the information processing device 21 determines whether or not there is a problem with the hardware or software of the information display device 31 (S3).

If it is determined in S2 that maintenance information cannot be acquired from the information display device 31 due to a network processing problem, the processing proceeds to S4. If it is determined that there is no network processing problem, the processing proceeds to S7 (discussed below).

If the information processing device 21 determines in S3 that maintenance information cannot be acquired via the LAN cable 41, the information processing device 21 switches to the acquisition of maintenance information via the UARTs 21*d* and 31*d* and the GMSL 21*f* (S4).

Next, the information processing device 21 acquires maintenance information from the information display device 31 via the UARTs 21*d* and 31*d* and the GMSL 21*f* (S5).

The information display device 31 acquires the voltage value or temperature value of an electronic component mounted on an electronic board, for example, in the same way as when receiving the acquisition of maintenance information via the LAN cable 41, and transmits the acquired result to the information processing device 21 via the UARTs 21*d* and 31*d* and the GMSL 21*f*.

Here, using communication via the UARTs 21*d* and 31*d* allows the signal of the UART 21*d* to be superimposed over the communication of the video signal via the GMSL 21*f*, and this simplifies the wiring.

In S5, when communication related to a maintenance request is received via the UARTs 21*d* and 31*d* and the GMSL 21*f*, the processor 31*b* of the information display device 31 transmits maintenance information to the information processing device 21 via the UARTs 21*d* and 31*d* and the GMSL 21*f* (S6).

The information processing device 21 determines whether or not there is an abnormality in the information display device 31 on the basis of the response for a voltage value or temperature value acquired from the information display device 31 in S2 or S6, and transmits the determination result to the crew member terminal 11 as a maintenance result (S7).

The information processing device 21 transmits the determination result from S7 to the crew member terminal 11, and the crew member terminal 11 displays the maintenance result, such as the received determination result related to whether there is an abnormality in the information display device 31, on the display 11*g* (S8).

The "maintenance result" here includes the acquired value for voltage or temperature for a specific electronic component installed in the information display device 31, and the determination result of whether or not the value falls within a predefined normal range. This makes it possible for a crew member to ascertain the defective part of the information display device 31 on the crew member terminal 11.

If a problem occurs in the Ethernet connection unit 31*a* and the processor 31*b* of the information display device 31 and the LAN cable 41 cannot be used, it will be impossible to ascertain defective part of the information display device 31 from the crew member terminal 11.

However, even in such a situation when the LAN cable 41 cannot be used, the information display system 10 can identify the defective part of the information display device 31 by communicating via the UARTs 21*d* and 31*d* and the GMSL 21*f*.

Also, with the present information display system 10, the information processing device 21 determines whether there is a problem in the network processing with the information display device 31 as in S3, and switches the communication means from the LAN cable 41 to the UARTs 21*d* and 31*d* and the GMSL 21*f*. This allows a crew member to carry out maintenance using the crew member terminal 11 without even being aware of the communication means.

Other Embodiments

The above embodiment was described as an example of the technology disclosed in the present application. However, the technology in the present disclosure is not limited to this, and can also be applied to embodiments in which appropriate changes, substitutions, additions, omissions, etc., are made.

(A)

In the information display system 10 according to this embodiment, it was indicated that when it is determined that a maintenance result cannot be acquired via the LAN cable 41, the system selectively switches to the acquisition of maintenance information via the UARTs 21*d* and 31*d* and the GMSL 21*f*, but the present disclosure is not limited to this.

For example, the determination in S3 may not be performed, and instead a crew member may operate the system so that communication is performed via the UARTs 21*d* and 31*d* and the GMSL 21*f*. Even in a situation in which Ethernet can be used, maintenance information may still be acquired via the UARTs 21*d* and 31*d* and the GMSL 21*f*.

(B)

In the above embodiment, an example was given in which the crew member terminal 11 was used as an external device and connected to the information processing device 21. However, the present invention is not limited to this.

For example, a personal computer (PC), a tablet terminal, or the like may be used as an external device and connected to the information processing device.

(C)

In the above embodiment, an example was given in which a signal obtained by combining a video signal and a maintenance signal was transmitted from the information processing device 21 to the information display device 31, and the information display device 31 separated the combined signal into the video signal and the maintenance signal. However, the present invention is not limited to this.

For example, the configuration may one that is compatible with transmitting only a maintenance signal from the information processing device to the information display device via a first signal line such as a GMSL, and transmitting information related to the acquisition of maintenance information from the information display device.

(D)

In the above embodiment, an example was given in which the aircraft shown in FIG. 1 was the mobile body on which the information display system 10 according to the present disclosure is installed. However, the present disclosure is not limited to this.

For example, a mobile body on which the information display system of the present disclosure is installed may be some other kind of moving body, such as a train, a bus, a ship, or the like instead of an aircraft.

What is claimed is:

1. An information display system that is installed in a mobile body, comprising:

an information processing device configured to receive a maintenance signal from an external device;

an information display device that is configured to have a different housing from that of the information processing device and that has a display configured to display images; and a first signal line configured to connect the information processing device and the information display device and allow a video signal of the display to be transmitted by serial communication, the information processing device has a first processing unit configured to combine the maintenance signal with a video signal to be displayed on the display and transmit the combined signal via the first signal line, and the information display device further has:

a response unit configured to respond to the maintenance signal, and a second processing unit configured to decompose the combined signal received from the first processing unit, transmit the maintenance signal to the response unit, and transmit the video signal to the display.

2. The information display system according to claim 1, wherein the response unit transmits the response to the information processing device via the first signal line, and the information processing device transmits the received response to the external device.

3. The information display system according to claim 1, further comprising a second signal line configured to connect the information processing device and the information display device and allow the maintenance signal to be transmitted by IP communication.

4. The information display system according to claim 3, wherein the information processing device is further connected to the external device via the second signal line, and receives the maintenance signal from the external device via the second signal line.

5. The information display system according to claim 3, wherein the response unit returns the response to the first signal line when the maintenance signal has been transmitted via the first signal line, and returns the response to the second signal line when the maintenance signal has been transmitted via the second signal line.

6. The information display system according to claim 3, wherein the information processing device determines whether the maintenance signal can be transmitted via the second signal line, and if it is determined that the signal cannot be transmitted, uses the first signal line to transmit the maintenance signal.

7. The information display system according to claim 1, wherein the information processing device has a first processor, the information display device has a second processor, and a processing capacity of the first processor is higher than a processing capacity of the second processor.

8. The information display system according to claim 7, wherein the first processing unit receives the video signal and the maintenance signal from the first processor via separate transmission paths, and combines the video signal and the maintenance signal.

9. The information display system according to claim 7, wherein the second processing unit separates the combined signal of the video signal and the maintenance signal received from the first processing unit, and transmits the video signal to the display and transmits the maintenance signal to the second processor.

10. The information display system according to claim 1, wherein upon receipt of the maintenance signal, the response unit of the information display device transmits to the information processing device a response that includes at least a voltage value and a temperature value for an electronic component attached to the information display device.

11. The information display system according to claim 10, wherein the information processing device determines whether or not the information display device is normal on the basis of the response, and transmits a determination result to the external device.

12. The information display system according to claim 1, wherein the mobile body is an aircraft, and the external device is an airframe system.

* * * * *